No. 698,156. Patented Apr. 22, 1902.
E. THOMSON.
SYSTEM OF ELECTRIC DISTRIBUTION.
(Application filed Nov. 2, 1885.)

(No Model.)

Witnesses:
E. L. Lawler.
Otto Greenberg

Inventor:
E. Thomson
By␣␣Townsend
Atty

UNITED STATES PATENT OFFICE.

ELIHU THOMSON, OF LYNN, MASSACHUSETTS, ASSIGNOR TO THE THOMSON-HOUSTON ELECTRIC COMPANY, A CORPORATION OF CONNECTICUT.

SYSTEM OF ELECTRIC DISTRIBUTION.

SPECIFICATION forming part of Letters Patent No. 698,156, dated April 22, 1902.

Application filed November 2, 1885. Serial No. 181,566. (No model.)

*To all whom it may concern:*

Be it known that I, ELIHU THOMSON, a citizen of the United States, and a resident of Lynn, in the county of Essex and State of Massachusetts, have invented a certain new and useful System of Electric Distribution, of which the following is a specification.

My present invention relates to means whereby electricity generated at a station and conveyed over mains or distributing-circuits may be utilized at different points through the intervention of induction-coils in local circuits, each of which may be supplied with currents induced by the action of current on the main and of any desired strength or electromotive force for each different local circuit.

The object of the invention is principally to permit the employment of currents of comparatively high potential upon the mains leading from the supply-station and the utilization of the electric energy of the main in electric energy of lower potential in different local circuits, without, however, interrupting the continuity in any way of the electric main leading from the central station.

My invention consists in a novel system of electric supply, comprising in combination electric mains or supply-conductors furnished from a suitable supply-station with alternating or reverse currents of comparatively high potential, induction-coils, or other suitable means for inductively transforming the alternating currents into induced currents on local circuits, said induction-coils being placed with their primaries connected at intervals to the mains, so as to be in multiple arc with one another in relation to said mains, and secondary coils or circuits connected to local circuits and properly proportioned to obtain the desired induced electric energy for operating electric lights, motors, or other electric translating devices.

By means of the combination of apparatus forming the system specified I am enabled to secure economy in the distribution of electric energy, facility for regulation, and freedom from the difficulties which might arise if there were interruptions in the continuity of the electric mains.

Figure 1:
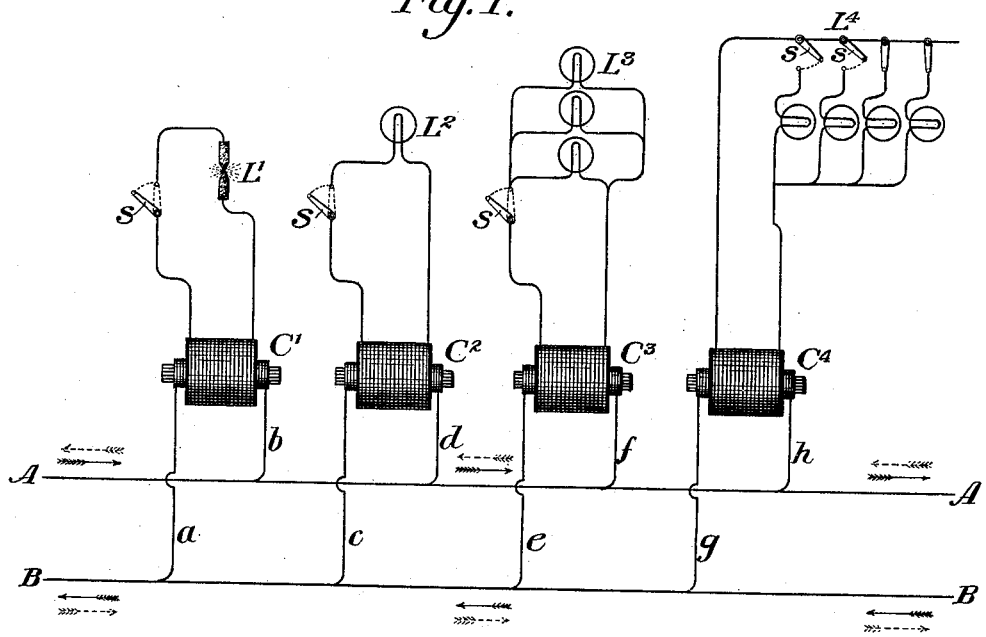
Figure 2:
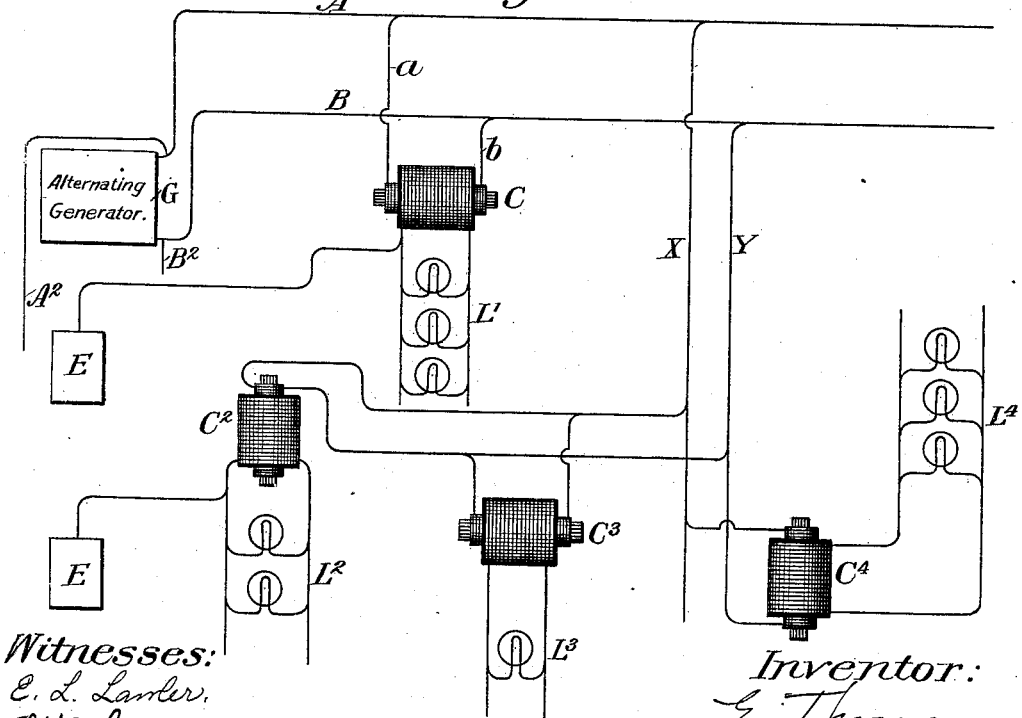

In the accompanying drawings, Figure 1 is a diagram illustrating my invention. Fig. 2 shows a modified arrangement of circuits embodying the invention.

Referring to the drawings, A and B indicate, respectively, two electric mains or supply-conductors that are respectively positive and negative alternately, as indicated by the reverse arrows in full and dotted lines. They are charged with alternating electric impulses or currents from any suitable source—as, for instance, a reverse-current or alternating-current generator connected to the mains—although I do not limit myself to a "dynamo-generator," so called, but may employ any means whereby a reversed electric condition may be produced at comparatively rapid intervals upon the mains A B and in any tap wire or branch connecting them, nor do I limit myself to the number of dynamo-generators or other means for supplying the mains with a reversed or alternating current, since a multiplicity of such devices may be employed and may be attached to the supply-mains at any desired points or in any desired series or relation. This, however, is a matter well understood in electric engineering and need not here be more fully specified.

Connected to the mains A B at various points and where desired and in circuit from one main to the other are the smaller tap or branch or tap wires $a\ b\ c\ d\ e\ f\ g\ h$, forming what is ordinarily termed a "multiple-arc connection" from one main to the other, and in these connections are the induction-coils $C'\ C^2\ C^3\ C^4$, which latter are of any desired form or kind, but as here shown are composed of the ordinary primary coil wound over an iron core, divided or not divided, as is deemed desirable, and a secondary coil also surrounding the same core and wound over beside or with its convolutions lying between the convolutions of the primary, as is well understood in the art.

The terminals of the secondary wire or coil are led, as indicated, to lights or other translating devices $L'\ L^2\ L^3\ L^4$, which may be arc-lights, single incandescent lights, or grouped incandescent lights or other devices and which secondary coils or circuits may be provided with switches S S S, &c., whereby the connection of the secondary wire may be interrupted with any or all of the lights, as may be desired. Such switching appliances are common and usual in the art as applied to electric circuits, local or otherwise.

The winding and proportioning of the coil is of course according to the well-known principles governing such work—that is, the secondary coils are wound of such size and diameter of wire as will, in conjunction with the primary coil used, deliver to the lights supplied by said secondary coil the requisite electromotive force, and the primary wires in multiple arc from the mains will be wound in such manner as to permit, without undue heating, the passage of the proper electrical impulses or currents to produce the needed impulses in the secondaries. These are matters of detail, being varied according to particular conditions.

In Fig. 2 is indicated at G a station or source of alternating currents from which mains A B and $A^2$ $B^2$, one or more sets, may be branched, only one set, A B, being shown as branched into its minor ramifications, the other, $A^2$ $B^2$, being shown, however, capable of like branching.

At X Y are shown branches from the mains A B, respectively, which are again branched as often as need be for supplying coils $C^2$ $C^3$ $C^4$, &c. These minor mains X Y, &c., may be made of decreasing size, according to the current they are desired to carry, a procedure usual in electrical work.

The mains A B, with their ramifications into smaller mains, may be carried to a considerable distance from the generating-station G and may be used with currents alternating in character and of such potential as to involve but small loss in the carriage; but, as in some instances this potential might involve the possibility of dangerous leaks, occurring from the primary to the secondary coils, and persons touching such secondary might receive discharges, especially when such persons are grounded, I prefer to apply the safety earth connection, as indicated at E E, in accordance with the principles set forth in patent granted to me July 14, 1885, and numbered 322,138.

The form of induction-coil used in the practice of my invention is of little consequence, provided it insure a good economy of induction between the primary and the secondary circuits. A very good form is described in British patent to Varley, No. 3,059 of 1856, in which form the iron wire forming the core of the coil is carried over the ends and external to the coil, or, in other words, the iron core is continuous through the axis and over the exterior of the coil.

What I claim as my invention is—

1. In a system of electric distribution, a series of secondary circuits of induction-coils supplying arc-lights or other devices, the primary coils of which induction-coils are multiple-arc branches of a single primary circuit, or set of mains A, B, through which alternating or reversed currents are flowing, as described.

2. In a system of electric distribution, a set of mains A, B, supplied by alternating currents, or alternating electrical impulses, rendering said mains alternately positive and negative with respect to each other, in combination with branch circuits taken from said mains at convenient points, and finally carried through the primary wires or coils of a set or series of induction-coils, the secondaries of which are connected to electric lamps, or other apparatus, for utilizing the impulses, generated in said secondaries by induction from the said primaries.

3. In a system of electric distribution, the combination with the high-potential mains through which alternating or reversed currents are flowing, of electric converters or reducers connected in multiple between said mains, and incandescent lamps or other translating devices supplied from said reducers with currents of lower tension and greater quantity than those circulating in the main circuit-coil of the converter.

Signed at Lynn, in the county of Essex and State of Massachusetts, this 30th day of October, A. D. 1885.

ELIHU THOMSON.

Witnesses:
J. W. GIBBONY,
GEORGE J. CARR.